United States Patent
Lynglev

(10) Patent No.: US 7,090,876 B2
(45) Date of Patent: Aug. 15, 2006

(54) METHOD FOR PRODUCING A FERMENTED DAIRY PRODUCT

(75) Inventor: Gitte Budolfsen Lynglev, Frederiksberg (DK)

(73) Assignee: Novozymes A/S, Bagsvaerd (DK)

( * ) Notice: Subject to any disclaimer, the term of this patent is extended or adjusted under 35 U.S.C. 154(b) by 568 days.

(21) Appl. No.: 10/282,380

(22) Filed: Oct. 29, 2002

(65) Prior Publication Data

US 2003/0113405 A1 Jun. 19, 2003

Related U.S. Application Data

(60) Provisional application No. 60/341,175, filed on Dec. 13, 2001, and provisional application No. 60/333,358, filed on Nov. 26, 2001.

(30) Foreign Application Priority Data

Nov. 2, 2001 (DK) .......................... 2001 01632
Dec. 13, 2001 (DK) .......................... 2001 01864

(51) Int. Cl.
*A23C 9/12* (2006.01)

(52) U.S. Cl. ............... 426/34; 426/42; 426/43; 426/580; 426/583

(58) Field of Classification Search ............. 426/34, 426/36, 37, 38, 39, 42, 43, 580, 583
See application file for complete search history.

(56) References Cited

U.S. PATENT DOCUMENTS 6,165,761 A    12/2000  Schneider et al.

OTHER PUBLICATIONS

Savary et al., Enzyme and Microbial Technology, vol. 29, p. 42–51 (2001).
Rand et al., Journal of Food and Science, vol. 37, p. 68–71 (1972).
Rand et al., Journal of Dairy Science, vol. 58, p. 1144–1150 (no date).
Tahajod et al., Cultural Dairy Products Journal, p. 10–14 (1993).
Wright et al., Journal of Food and Science, vol. 38, p. 1132–1135 (1973).
Lin et al., Biotech, Adv., vol. 11, pp. 417–427, (1993).
Satory et al., Biotechnology Letters, vol. 19, No. 12, pp. 1205–1208, (1997).
Japanesse Abstract No. JP48016612B, 1973.

*Primary Examiner*—Leslie Wong
(74) *Attorney, Agent, or Firm*—Elias Lambiris; Jason Garbell

(57) ABSTRACT

The present invention relates to a method for producing a fermented dairy product including the use of an oxidase for the conversion of lactose to lactobionic acid. Moreover, it refers to a method for affecting firmness and/or sourness of a fermented dairy product. Hereby is produced a fermented dairy product having improved functional and/or organoleptic properties.

10 Claims, No Drawings

METHOD FOR PRODUCING A FERMENTED DAIRY PRODUCT

CROSS-REFERENCE TO RELATED APPLICATIONS

This application claims, under 35 U.S.C. 119, priority of Danish application nos. PA 2001 01632, filed on Nov. 2, 2001, PA 2001 01864, filed on Dec. 13, 2001 and claims the benefit of U.S. provisional application Nos. 60/333,358, filed on Nov. 26, 2001 and 60/341,175, filed on Dec. 13, 2001 the contents of which are fully incorporated herein by reference.

TECHNICAL FIELD

The present invention relates to a method for producing a fermented dairy product including the use of an oxidase for the conversion of lactose to lactobionic acid.

BACKGROUND OF THE INVENTION

In the production of fermented dairy products, such as yoghurt, cream cheese, cottage cheese etc. functional and/or organoleptic properties, as well as nutritional value are of importance. Among the organoleptic properties sourness, firmness and mouthfeel of the dairy product is of great importance for customer acceptance. Moreover, there are differences in customer acceptance based on national and cultural differences, which fact requires these properties to be adjustable.

Many efforts have been exercised in order to generate dairy products of nutritional value and with improved functional and/or organoleptic properties, including acidified, edible gels on milk basis. A typical example of such products is desserts, especially yoghurt and curd. In order to prepare such products of satisfactory quality, it is today necessary to ferment dairy ingredients (whole or low fat milk, skim milk, condensed milk, and dried skim milk) using bacterial cultures. Some of these may be indigenous to milk or introduced during processing. Fermentation not only reduces pH of the milk, but also results in the smooth, viscous liquid or soft curd characteristic of yoghurts. Stabilizers and sweeteners are often added during processing to modify texture and/or prevent syneresis as well as reduce intensity of the tart or sour flavor (Kosikowski & Mistry: Cheese and fermented milk products). For example, Swiss-style yoghurt uses large amounts up to 0.75% of stabilizer to obtain products of high viscosity.

In many fermented dairy products, particularly yoghurt products, firmness and sourness are of great importance. E.g. yoghurt is a soft-textured product where texture and sourness are of specific importance for the final product to be used, eaten as such, or used in a prepared ready-to-eat form. Metabolic activity of the bacterial cultures generate volatile flavor compounds such as acetic acid, diacetyl, and acetaldehyde which coupled with the acidity contribute to the unique sour or tart flavor characteristic of yoghurts. However, the tartness or sourness may be too intense and may need to be reduced by adding sweeteners. Another unique characteristic of yoghurt is its viscosity and smooth mouthfeel. The occurrence of syneresis during storage releases whey from the smooth gel matrix resulting in significant changes in texture. Hence the addition of stabilizers to prevent or control syneresis. Excessive addition of stabilizers, however, could also make the product too viscous adversely affecting mouthfeel and taste.

Wright and Rand, 1973; J. Food Sci. 38: 1132–1135 discloses enzymatic conversion of lactose to lactobiotic acid and its use to acidify milk.

Lin et al., 1993; Biotech. Adv. 11: 417–427 discloses the use of an oligosaccharide oxidase to convert lactose to lactobionic acid in a wheat bran substrate.

Satory et al., 1997; Biotechnol. Lett. 19:1205–1208 discloses the use of glucose-fructose oxidoreductase (GFOR) for the conversion of lactose to lactobionic acid.

None of these references discusses the use of enzymatic conversion of lactose to lactobionic acid for affecting functional and/or organoleptic properties, such as firmness and sourness of a dairy product.

Thus, there is a need for an improved method for the preparation of fermented dairy products, in particular a method for providing dairy products having improved functional and/or organoleptic properties.

One object of the present invention is to provide a method for the preparation of a fermented dairy product having improved firmness. Specifically, it is an object to provide a less firm fermented dairy product.

Another object of the present invention is to provide a method for the preparation of a fermented dairy product having improved taste. Specifically, it is an object to provide a less sour fermented dairy product.

A still further object of the present invention is to provide a method for affecting firmness and sourness of a fermented dairy product. Specifically, it is an object to provide a less firm and less sour fermented dairy product.

SUMMARY OF THE INVENTION

According to the invention it has been found that by the use of an oxidase from *Microdochium* in the preparation of a fermented dairy product it has been possible to affect the firmness and sourness of the resulting product. It has specifically been found that it is thereby possible to produce a less firm and less sour fermented dairy product.

Thus, the present invention relates to a method for the preparation of a fermented dairy product comprising the steps of providing a dairy base contacting the dairy base with a starter culture for fermentation adding to the dairy base, prior to or during fermentation, an oxidase, produced by a fungus belonging to the genus *Microdochium,* for conversion of lactose to lactobionic acid to give a fermented dairy product.

In a further aspect the invention relates to a method for affecting firmness of a fermented dairy product comprising the steps of providing a dairy base contacting the dairy base with a starter culture for fermentation adding to the dairy base, prior to or during fermentation, an oxidase, produced by a fungus belonging to the genus *Microdochium,* for conversion of lactose to lactobionic acid to give a fermented dairy product.

In yet a further aspect the present invention relates to a method for affecting firmness and/or sourness of a fermented acidified dairy product comprising the steps of providing a dairy base contacting the dairy base with a starter culture for fermentation adding to the dairy base, prior to or during fermentation, an oxidase, produced by a fungus belonging to the genus *Microdochium,* for conversion of lactose to lactobionic acid to give a fermented acidified dairy product.

Moreover, the present invention refers to the use of an oxidase, produced by a fungus belonging to the genus *Microdochium,* in combination with fermentation of a dairy base in the production of a fermented dairy product for conversion of lactose to lactobionic acid.

Finally, the present invention refers to fermented dairy products produced by the above methods.

DETAILED DISCLOSURE OF THE INVENTION

The present invention refers to the preparation of a fermented dairy product having improved functional and/or organoleptic properties. Specifically, it refers to the preparation of a fermented dairy product having improved firmness and taste.

Dairy Base and the Preparation of a Fermented Dairy Product

In the present context the term "dairy base" is to be understood as any milk or milk like product including lactose, such as whole or low fat milk, skim milk, condensed milk, dried skim milk or cream originating from any animal. "Milk" is here to be understood as the lacteal secretion obtained by milking any animal, such as cows, sheep, goats, buffaloes or camels. Also, it is to be understood that the milk or milk like product can be produced by suspending skim milk powder and/or full fat milk powder in an aqueous medium.

In the present context the term "fermented dairy product" is to be understood as any dairy product including a dairy base, as defined above, and being subjected to any type of fermentation. Examples of fermented dairy products applicable for the present invention are products like yoghurt, cream cheese and cottage cheese.

For the preparation of a fermented dairy product a dairy base, as defined above, is provided. The dairy base may be heat treated by pasteurisation, sterilization or treated in any other appropriate way. The pasteurisation and sterilization procedures may be any such procedure known in the art. For fermentation the dairy base is contacted with a starter culture, which is chosen depending on the product to be produced. Examples of starter cultures to be used according to the invention are lactic starter cultures, such as yoghurt cultures (*Lactobacillus delbrueckii* subsp. *bulgaricus* and *Streptococcus thermophilus.* Others include *Lactobacillus acidophilus, Lactobacillus lactis,* and bifidobacteria), cheese cultures (*Lactococcus* spp. *Lactobacillus* spp. *Streptococcus* spp.). Such cultures are readily available from e.g. Chr. Hansen A/S, Denmark. However, any starter culture available within the art and suitable for producing a fermented dairy product may be used.

Doses of starter culture added and incubation temperatures vary depending e.g. on the culture/dairy base used and the final product required. However, culture doses often range between 2–5% inoculated into warm homogenized mix and incubated at about 45° C. for about 3–6 hrs until pH drops to about 4.4. In some cases, a lower temperature (32° C.) coupled with a lower culture dose of 0.25% may be used with long incubation times (12–14 hrs).

Prior to or during the fermentation the dairy base is subjected to an oxidase produced by a fungus belonging to the genus *Microdochium.* Preferably the fungus is *Microdochium nivale,* such as *Microdochium nivale* as deposited under the deposition no CBS 100236. Subjecting the dairy base to a *Microdochium* oxidase results in the conversion of lactose in the dairy base to lactobionic acid.

Doses of enzyme added vary depending on e.g. dairy base used and the specific product to be produced. Doses of enzyme added may range from 4–20 units/100 ml dairy base, a preferred level being about 10 units/100 ml dairy base.

The dairy base including the starter culture and the oxidase is allowed to ferment under conditions generally known in the art. Examples of fermentation conditions are 40–46° C. for 3–6 hrs until a pH of 4.2–4.6 is reached. In some cases, it may be possible to use lower doses of culture (about 0.25%) and incubation at about 32° C. for as long as 12–14 hrs until the desired final pH is reached.

According to the present invention the oxidase is used to affect functional and/or organoleptic properties, such as firmness and sourness, of the dairy product to be produced. If necessary, additives, such as stabilizers and sweeteners, may be added to the dairy product.

In a further embodiment of the present invention the oxidase treated dairy base sample is subjected to a heat treatment prior to fermentation. The dairy base is heat treated before the addition of starter culture thereto and as an example the heat treatment may be performed 20–40 min, such as 30 min after the addition of oxidase. The heat treatment per se may be a treatment of up to about 90° C., such as around 60–90° C., e.g. 60–75° C., for 35 sec–5 min. One example of heat treatment is 90° C. for 5 min. In one embodiment of the invention the heat treatment is sufficient to inactivate the oxidase enzyme.

One effect of this heat treatment is that the lowering of the firmness is less pronounced (as shown by sample no 4 in example 1), whereas the product still shows a reduction of the sourness.

Products Produced by the Method of the Invention

The product produced by the present invention may be any fermented dairy product, as defined above. Examples of such products are yoghurts, cream cheeses and cottage cheeses, some specific examples of which are further disclosed below.

Flavored and Plain Yoghurts:

Milk mix is pre-heated or concentrated to pasteurisation temperature and 0.5% stabilizer added, if required. This is homogenized and pasteurised at 91° C. for 40–60 sec (HTST) or 85° C. for 30 min. The pasteurised mix is cooled to about 46° C. and after holding for about 15 min at this temperature; it is inoculated with appropriate dose of culture. For flavoured products, recommended amounts of essences are added at this point, packaged, and incubated at this temperature for about 4–6 hrs or until firm smooth gel is formed. At this point, pH should be about 4.5. These are then transferred to 2° C. chill rooms where the fresh yoghurt is rapidly chilled to 7° C. in less than an hour. These are stored at 4° C. for 1–2 months.

Pasteurised or Heated Yoghurt

The freshly prepared yoghurt makes up the basic ingredient for heated or pasteurized yoghurt which is prepared by adding 0.15–0.2% stabilizer (e.g., locust bean gum or alginate). The stabilized product is heated at 62° C. or 75° C. for 35 sec for direct hot packaging or cooling prior to aseptic packaging.

Low Lactose Yoghurt

For low lactose yoghurt, lactase is added to milk and held overnight at 4° C. until about 60% lactose is hydrolyzed. Lactose reduction is sometimes achieved by ultrafiltration of the milk blend or a combination of ultrafiltration and lactase treatment. The mix is then pasteurized and incubated at 43° C. with appropriate culture until curd is properly set. This is then chilled as for plain or flavoured yoghurt.

In all examples mentioned above, the enzyme may be incorporated at the appropriate stages as outlined in the description and the examples.

The yoghurts produced by the method of the present invention comprise all varieties of yoghurts, such as, yoghurt mousse, Acidophilus and Bifidus yoghurt, low lactose yoghurt, low fat and non-fat yoghurts, heated or pasteurised yoghurt.

The cheeses produced by the process of the present invention comprise all varieties of cheese, such as, e.g., Manchego, Saint Paulin, Soft cheese, White cheese, including rennet-curd cheese produced by rennet-coagulation of the cheese curd; ripened cheeses such as Cheddar, Colby, Camembert, fresh cheeses such as Mozzarella and Feta; acid coagulated cheeses such as cream cheese, Neufchatel, Quarg, Cottage Cheese and Queso Blanco; and pasta filata cheese.

Discussion and Further Aspects of the Invention

According to the present invention a fermented dairy product having an improved firmness is provided. Specifically, a fermented dairy product having a reduced firmness is provided. One example of such a product is yoghurt and by means of the present invention a softer yoghurt is provided, which in many cases will be experienced as a product having better mouthfeel than a more firm product.

In another aspect of the invention a fermented acidified dairy product having an improved sourness is provided. Specifically, a fermented acidified dairy product having a reduced sourness is provided. One example of such a product is yoghurt and the characteristic yoghurt taste, specifically related to acetaldehyde, is surprisingly reduced by means of the present invention. This is shown in example 2.

In still another aspect of the invention a fermented acidified dairy product having an improved firmness is provided. Specifically, a fermented acidified dairy product having a reduced firmness is provided.

Thus, it is, by means of the invention, possible to affect the firmness and/or sourness of a fermented dairy product and in a preferred embodiment the dairy product produced by means of the invention has a firmness and/or a sourness which is lower than the firmness and/or sourness achieved in such a product without the addition of oxidase.

In a further embodiment of the present invention the oxidase treated dairy base, as described above, is heat treated before the addition of a starter culture. This results, as shown in example 1, no 4, in a product where the lowering of the firmness is less pronounced. However, the product still have a less sour taste.

A further aspect of the invention is the use of an oxidase, produced by a fungus belonging to the genus *Microdochium*, in combination with fermentation of a dairy base in the production of a fermented dairy product for conversion of lactose to lactobionic acid.

Preferably the fungus is *Microdochium nivale*, such as *Microdochium nivale* as deposited under the deposition no CBS 100236 or any other species as defined above.

Further aspects of the invention are fermented dairy products produced by the method according to the invention. The products of the invention have improved functional and/or organoleptic properties, such as improved firmness and sourness. Specifically there is provided a fermented dairy product having a firmness being lower than the firmness achieved in such a product without the addition of an oxidase.

In a further embodiment a fermented acidified dairy product is provided having a sourness being lower than the sourness achieved without the addition of an oxidase.

In still a further embodiment a fermented acidified dairy product is provided having a firmness as well as a sourness being lower than the firmness and sourness achieved in such a product without the addition of an oxidase.

The present invention is further illustrated in the following examples, which are not to be in any way limiting the scope of protection.

EXAMPLES

For the determination of the oxidase effect on firmness and sourness of a fermented dairy product, such as a yoghurt culture, the following examples were performed. Materials and procedure used were as stated below.

Materials:

Culture prep.: DVS Thermophilic Lactic Culture, YC-350 (K) Package 50-U, Batch 5007571, a yoghurt culture from Chr. Hansen, Denmark 50 units diluted in 250 ml water 10 ml added/approx 180 ml milk Enzyme prep: *Microdochium nivale* CBS 100236 (no 00720 MCO), 10 units/100 ml milk (For the definition of units reference is made to WO 99/31990).

The following milk samples were prepared:

| | |
|---|---|
| 1 | Starter culture |
| 2 | Enz. no. 00720 MCO |
| 3 | Starter culture + enz. no. 00720 MCO |
| 4 | Enz. no. 00720 MCO, heat treated after 30 min at 40° C., then addition of culture |

Procedure:

A yoghurt was produced whereto enzyme was added during the fermentation. Firmness and taste evaluations were done and the achieved results are reported in examples 1 and 2, respectively. Full fat milk was heat treated at 90° C. for 5 min, tempered to approx. 40° C. and the above enzyme and/or culture was added. The samples were allowed to ferment at 40° C. until pH 4.2 was reached. After 30 min enzyme reaction at 40° C. sample no. 4 was heat treated for 5 min. at 90° C.

Example 1

Example 1 shows the effect of oxidase treatment on yoghurt firmness, comparing oxidase treated yoghurt with non-oxidase treated yoghurt.

Results:

TPA (Texture Profile Analysis) was tested on a TA-XT2 Texture Analyser (Texture Technologies Corp, Scarsdale, N.Y.).

Parameters: 20 mm probe; 20% deformation; 2 sec. rest between each profile; 2 mm/sec pre test speed; 5 mm/sec post test speed

TABLE 1

| | | ./ Firmness (max force measured, N) | | | |
|---|---|---|---|---|---|
| | Sample no. | Test 1 Firmness | Test 2 Firmness | Average | Standard deviation |
| Starter culture | 1 | 0.68 | 0.692 | 0.686 | 0.008 |
| enz. no. 00720 MCO | 2 | 0 | 0 | 0.000 | 0.000 |

TABLE 1-continued

| | ./ Firmness (max force measured, N) | | | | |
|---|---|---|---|---|---|
| | Sample no. | Test 1 Firmness | Test 2 Firmness | Average | Standard deviation |
| Starter culture + enz. no. 00720 MCO | 3 | 0.459 | 0.456 | 0.458 | 0.002 |
| enz. no. 00720 MCO heat treated after 30 min at 40° C. Then addition of culture | 4 | 0.639 | 0.579 | 0.609 | 0.042 |

Discussion:

The enzyme treated sample no 3 shows a substantially lower firmness than sample no 1, not being enzyme treated. Also sample no 4, where the enzyme has been heat treated before culture addition shows a significantly lower firmness than sample no 1. The enzyme treated yoghurt no 3, though softer than the control, is able to hold its shape since TPA analysis requires the sample to have some defined shape.

Example 2

Example 2 shows the effect of oxidase treatment on yoghurt taste, comparing oxidase treated yoghurt with non-oxidase treated yoghurt.

Taste Evaluations:

3 judges evaluated the 3 cooled yoghurts at day 7.

TABLE 2

| | Comments | | |
|---|---|---|---|
| Judge/sample no. | 1 | 2 | 3 |
| Judges 1–3 | Sour acetaldehyde Blue/sour smell | liquid | Less sour than no. 1. |

Discussion:

The characteristic yoghurt taste (acetaldehyde) was less pronounced in the enzyme treated sample no 3.

What is claimed is:

1. A method for preparing a fermented dairy product, comprising
   a) providing a dairy base; and
   b) fermenting the dairy base with a starter culture to produce a fermented dairy product;
   wherein prior to or during fermentation, adding the dairy base an oxidase produced by a fungus belonging to the genus *Microdochium*.

2. The method of claim 1, wherein the fermented dairy product is a fermented acidified dairy product.

3. The method of claim 1, wherein the fermented dairy product has improved firmness as compared to a fermented dairy product which was produced without the addition of the oxidase.

4. The method claim 1, wherein the dairy product is a fermented acidified dairy product, and wherein the dairy product has improved firmness and/sourness as compared to a fermented acidified dairy product which was produced without the addition of the oxidase.

5. The method of claim 1, wherein the fungus is *Microdochium nivale*.

6. The method of claim 1, wherein the fungus is *Microdochium nivale* CBS 100236.

7. The method of claim 1, further comprising the step of heat treating the dairy base after the addition of oxidase, but prior to adding a starter culture for fermenting the dairy base.

8. The method of claim 1, wherein the starter culture is a lactic starter culture.

9. The method of claim 1, wherein the starter culture is a yogurt culture.

10. The method of claim 1, wherein the fermented dairy product is a yogurt product.

* * * * *